(12) United States Patent
Sanchez

(10) Patent No.: US 6,449,479 B1
(45) Date of Patent: Sep. 10, 2002

(54) APPARATUS AND METHOD FOR MOBILE SUBSCRIBER SERVICE MODIFICATION

(75) Inventor: Eduardo Sanchez, Coahuila (MX)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/303,771

(22) Filed: Apr. 30, 1999

(51) Int. Cl.[7] .................................................. H04Q 7/20
(52) U.S. Cl. ........................ 455/433; 455/565; 455/418
(58) Field of Search .............................. 455/432, 433, 455/410, 414, 435, 461, 466, 412, 456, 565, 418

(56) References Cited

U.S. PATENT DOCUMENTS

| | | | | |
|---|---|---|---|---|
| 5,564,068 A | * | 10/1996 | Nguyen | 455/433 |
| 5,577,103 A | * | 11/1996 | Foti | 455/412 |
| 5,579,375 A | * | 11/1996 | Ginter | 455/417 |
| 5,913,165 A | * | 6/1999 | Foti | 455/435 |
| 5,915,220 A | * | 6/1999 | Chelliah | 455/435 |
| 5,953,653 A | * | 9/1999 | Josenhans et al. | 455/410 |
| 5,978,669 A | * | 11/1999 | Sanmugam | 455/410 |
| 6,026,291 A | * | 2/2000 | Carlsson et al. | 455/406 |
| 6,067,454 A | * | 5/2000 | Foti | 455/433 |
| 6,108,540 A | * | 8/2000 | Sonti et al. | 455/433 |

FOREIGN PATENT DOCUMENTS

| | | | | |
|---|---|---|---|---|
| EP | 0 863 678 A2 | 9/1998 | | H04Q/3/00 |
| WO | WO 98/10596 | 3/1998 | | |
| WO | WO 98/23099 | * 5/1998 | | H04Q/7/00 |
| WO | WO 98/28930 | 7/1998 | | H04Q/7/20 |

* cited by examiner

*Primary Examiner*—Nay Maung
*Assistant Examiner*—Sonny Trinh
(74) *Attorney, Agent, or Firm*—Jenkens & Gilchrist

(57) ABSTRACT

An apparatus for changing a mobile subscriber's feature profile in a telecommunications network comprises a Home Location Register having a means to change the profile and a memory for storing the profile, in electronic communication with a node. The node includes a means to recognize the subscriber change request, a means to validate the request, a means to determine whether the subscriber is currently using a mobile phone to which the profile is assigned, and a means to prevent changes to the profile, with the exception of the selected service feature if the subscriber is not currently using the phone to which the profile is assigned. The invention also is embodied in a method for changing a mobile subscriber's feature profile which comprises the steps of sending a mobile subscriber request to a node changing a selected service feature, validating the request, determining whether the requesting mobile subscriber is currently using a mobile phone to which the profile is assigned, and preventing changes to the profile, with the exception of the selected service feature (if the subscriber is not currently using the mobile phone to which the profile is assigned).

55 Claims, 2 Drawing Sheets

APPARATUS AND METHOD FOR MOBILE SUBSCRIBER SERVICE MODIFICATION

BACKGROUND OF THE INVENTION

1. Technical Field

This invention relates generally to apparatus and methods for mobile subscriber service access and modification. More particularly, the invention relates to a method and apparatus whereby a mobile subscriber is able to reliably access and change the subscriber services available to him using any available telephone, and not just the mobile telephone assigned particularly to those services.

2. History of Related Art

Some methods for updating or changing the feature profile for a mobile subscriber make use of a manual operator controlling the appropriate Home Location Register. This system is very tedious, and susceptible to congestion as more mobile users attempt to modify their profiles on-line.

Radio telecommunication networks now permit a mobile subscriber to utilize his mobile telephone, i.e., an assigned, dedicated mobile station, to access the network in an automated fashion to change the subscriber feature profile. However, in some circumstances, the subscriber may wish to change his profile without using the dedicated mobile station assigned to him. For example, the assigned mobile station battery may be dead, the assigned mobile station may not be available to him, or the fees incurred to change services using the assigned mobile station may be exorbitant. In these situations, it may be desirable to change the mobile subscriber service feature profile using a standard wireline telephone, or another mobile station.

Several approaches have been developed to deal with this problem. One such approach involves the use of a "pilot number" which is explicitly allocated within a Mobile Service Center (MSC) to handle all accesses to service feature profile changes when such modifications are to be made using a different (i.e., non-assigned) phone, rather than the one assigned to the subscriber.

Typically, the subscriber dials the pilot number to gain access to the available features, and requests a change. The subscriber is required to identify itself, usually be entry of the dedicated mobile station telephone number, after receiving a recorded message. To verify and validate the subscriber's identity, the MSC requests certain information, including the subscriber's profile and Personal Identification Number (PIN) from the Home Location Register (HLR). The request is usually sent in the form of a Qualification Request, or QUALREQ, message.

When the user profile is requested, the HLR assumes that the assigned, or dedicated, mobile station is the actual instrument used to access the pilot number, which results in unpredictable behavior. That is, depending on the manufacturer of a particular HLR, using a non-assigned phone to effect profile changes may bring about several different, undesirable, actions within the HLR as a result of the QUALREQ message receipt. These include:

a) marking an assigned mobile station that is turned off as "active";

b) wrongfully pointing to the dialing subscriber as a "fraudulent" entity;

c) changing the subscriber's location to a node (e.g. the pilot node) where the subscriber is not registered, such that the subscriber is unable to receive any calls for some period of time; and d) on some occasions, the authentication feature in the HLR may refuse access for changing the subscriber's profile, because the assigned mobile station does not respond to an authentication request by the HLR.

This problem is compounded when no pilot number is used for changing subscriber services, or service provisioning, as it is known in the art, such as when the subscriber travels out of the service area with the dedicated mobile station. It can be quite costly to update the provision of services using the assigned mobile station, as opposed to a local landline telephone.

Further, problems may arise, such as when rudimentary update services query the subscriber with respect to services already active, or offer both the active choice and the inactive choice, when only one such provision is sensible. For example, the subscriber may be asked "Would you like to activate call waiting? Enter #1 for YES and enter #2 for NO." The more efficient method of updating the service provision would be to state "You have call waiting active. Enter #1 to de-activate."

Therefore, what is needed is a method and apparatus which provides subscribers with a mean to modify service provisioning from any telephone, whether it is the assigned mobile station roaming out of the service area, a landline telephone operating through a Public Service Telephone Network (PSTN), or simply a mobile station which has not been dedicated to the particular subscriber desiring to update his subscriber services (i.e. a non-assigned mobile station). Further, such a method and apparatus should be able to account for services which are already active, and operate in a fashion which makes the most efficient use of air time.

SUMMARY OF THE INVENTION

The apparatus for changing a mobile subscriber's feature profile in a telecommunications network comprises a Home Location Register (HLR) with a memory for storing the feature profile, which includes one or more service features, such as call waiting, call blocking, etc. The apparatus also includes a node which communicates electronically with the HLR. The node includes a means to recognize a subscriber feature profile change request, a means to validate the request, a means to determine whether the subscriber is currently using the mobile phone to which the profile is assigned, a means to change the profile and a means to prevent changes in the profile except for that specifically requested by the subscriber (if the subscriber is not using the mobile phone to which the profile is assigned).

The ability to prevent changes to the profile, other than that specifically requested by the subscriber, is especially important in the case of the current location of the mobile phone to which the profile is assigned, and the activity indicator for the assigned phone (i.e., whether the phone is ON or OFF). The means for recognizing the request from the subscriber may use a feature code entered by the subscriber. The means for validating the request may also use a PIN entered by the subscriber. Typically, the means to determine whether the subscriber requesting the change is currently using the mobile phone assigned to the user profile makes use of a Mobile Subscriber Directory Number (MSDN) compared with an Electronic Serial Number (ESN) of the mobile phone used to make the request, or a landline calling phone number for a telephone accessing the profile from a PSTN. In addition, the determination can be made by using a first feature code for access to change the desired profile feature and implement all of the regular HLR checks and profile changes by the assigned phone, and a different feature code can be used to allow only the desired profile feature change, and prevent the other HLR checks and profile changes (e.g. phone location update) that would normally be implemented. A software program module residing in a memory, or some other device located in the node, is typically used as a means to change the profile, and as a means to prevent undesirable changes to the user profile.

The invention includes a method for changing a mobile subscriber's feature profile within a telecommunications network comprising the steps of requesting a change from the node for a selected service feature, validating the request, determining whether the subscriber is currently using a mobile phone to which the profile is assigned, and if not, making only the changes to the profile selected by the subscriber. The node may include a memory containing a PIN, which is compared with another PIN entered by the subscriber before validation. The request sent to the node may occur by dialing a directory number of a pilot node which is in electronic communication with a PSTN.

In the case of the apparatus or method, the node may include an MSC, or a combination of a MSC and a Visitor Location Register (VLR).

The method for changing a mobile subscriber feature profile may be shortened to requesting a change for a selected one of the service features, validating the request, and preventing changes to the profile, other than that selected by the subscriber, if the telephone used to make the request is not the mobile phone to which the profile is assigned.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
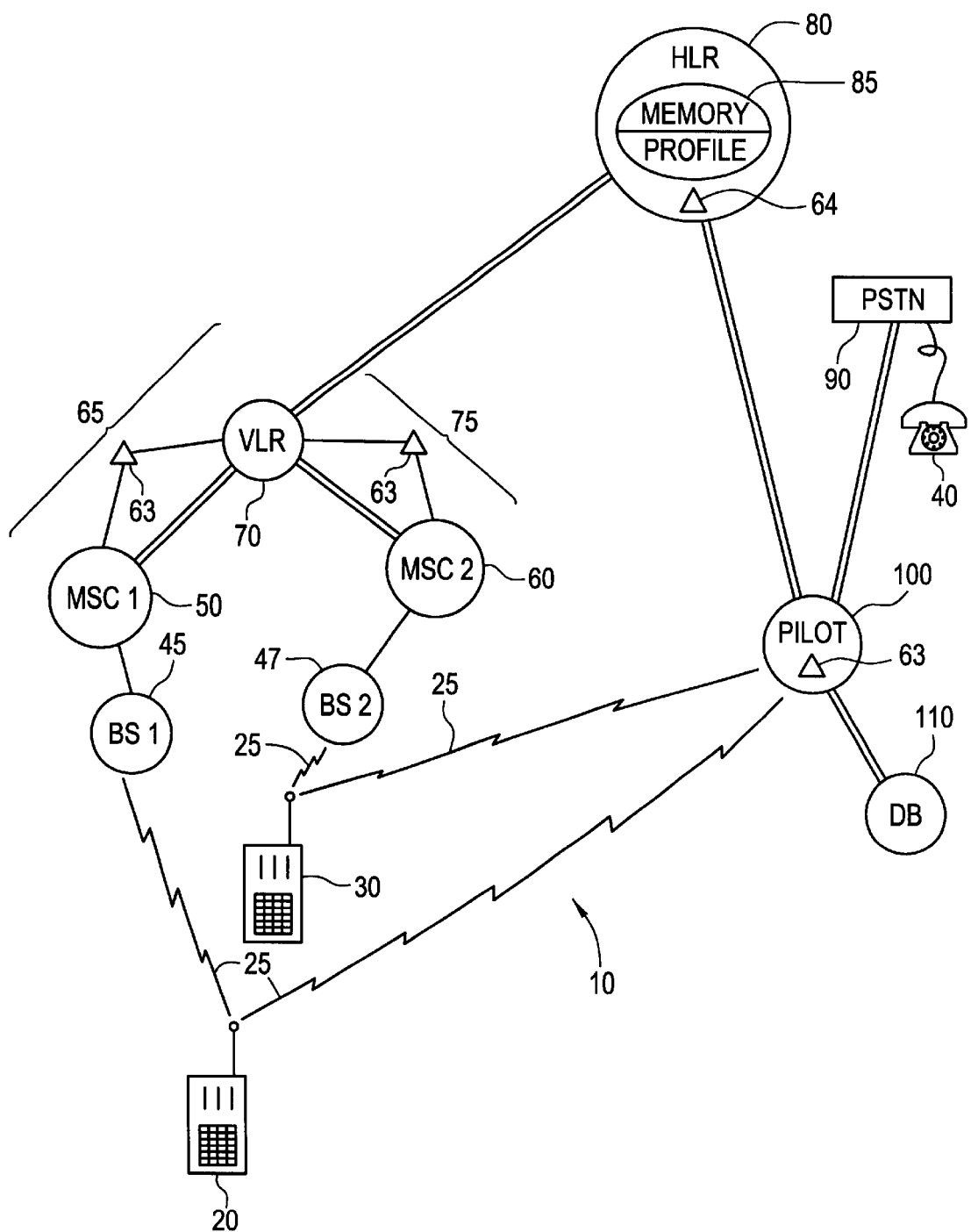
FIG. 1 is a block diagram illustrating a telecommunications network in which the apparatus of the present invention is embodied.

FIG. 1 illustrates a telecommunications network 10 comprising a first and second base station (BS1, BS2) 45, 47, each in electronic communication with a first and second Mobile Switching Center (MSC1, MSC2) 50 and 60, respectively, a Visitor Location Register 70 (VLR), a Home Location Register (HLR) 80 containing a memory 85, a pilot node 100 in electronic communication with a database 110, and a Public Switched Telephone Network 90 (PSTN).

Typically, an Assigned Mobile Station 20 (AMS) is in electronic communication with a first base station 45 by means of electromagnetic waves 25. Similarly, a Non-assigned Mobile Station 30 (NMS) is in electronic communication with a second base station 47, also by means of electromagnetic waves 25. The AMS 20 is designated as "assigned" because it is this mobile station which has an Electronic Serial Number (ESN) corresponding to the user feature profile stored in the memory 85 of the HLR 80. One possible way of determining whether the mobile station is assigned to the profile is to use the Mobile Station Directory Number (MSDN) which propagates through the network 10 when the AMS 20 or NMS 30 are used to make call. Another method which may be used to distinguish between the phones 20 and 30 is to use a different feature code as part of the dialed digits; a first code for the AMS 20, and a second code of the NMS 30. The NMS 30 or a landline phone 40 attempting to access the subscriber feature profile information in the memory 85 will not possess the ESN or MSDN of the AMS 20.

A Subscriber Controlled Subscription service (SCS), which may be included in the present invention, enables a subscriber to access an automated, interactive service menu system by dialing an initial digit or feature code, plus an identification PIN. If the PIN is not entered with the feature code, the subscriber may be queried by the MSC1/VLR node 65 for the proper PIN. If the node recognizes the request from the subscriber to change a selected one of the features, and validates the request from the subscriber using the PIN, then the subscriber may respond with the proper menu code indicating the specific feature change required and the activity level desired (e.g. activate or passivate, as appropriate).

For the purposes of this discussion, it can be assumed that the AMS 20 and the NMS 30 are interchangeable and equivalent (except for their respective ESN and MSDN, or first and second feature codes, used to effect profile changes). While the AMS 20 will necessarily be treated differently than the NMS 30 by the apparatus and method of the invention, they are both capable of making a request by the subscriber to change its feature profile within the telecommunications network 10. AMS 20 may make the request through the BS1 45, MSC1 50, and VLR 70 chain. Alternatively, NMS 30 may make the same request through the BS2 47, MSC2 60, and VLR 70 chain.

The combination node 65 may comprise MSC1 50, or MSC1 50 and VLR 70. The various means required to recognize a request from the mobile subscriber, validate the request, determine whether the subscriber is currently using a mobile phone to which the profile is assigned (i.e., AMS 20), or not (NMS 30), and the means to prevent changes to the profile with the exception of the selected service feature are typically embodied in a program module 63 or series of such modules 63 which reside in the MSC1/VLR combination node 65 memory.

The combination node 75 may comprise the MSC2 60, or the MSC2 60 and VLR 70. The various means required to recognize a request from the mobile subscriber, validate the request, determine whether the subscriber is currently using a mobile phone to which the profile is assigned (i.e., AMS 20) or not (i.e., NMS 30), and the means to prevent changes to the profile with the exception of the selected service feature are typically embodied in a program module 63 or series of such modules 63 which reside in the MSC2/VLR combination node 75 memory.

After the selection by the subscriber is complete, the change request is sent from the MSC1/VLR node 75 to the HLR 80 using a Feature Request (FEATREQ) message. The message includes a data flag (e.g. a proprietary ORIGINATION FLAG) indicating that the request from the mobile subscriber has been recognized and validated, and that no other features, other than the one requested, are to be changed within the profile. After the HLR 80 updates the subscriber feature profile in the HLR memory 85, a Qualification Directive (QUALDIR) message is sent to the MSC2/VLR node 75 to update the subscriber class.

Thus, the apparatus for changing a mobile subscriber's feature profile in the telecommunications network 10 comprises a HLR 80 having a means to change the profile, such as a microprocessor, programmable logic, or a program module 64, a memory 85 for storing the profile and optionally, the module 64, and a node 75 in electronic communication with the hlr 80. The node may comprise an MSC2 60, or a combination of the MSC2 60 and a VLR 70, making up the MSC2/VLR combination node 75.

The nodes 65 and 75 includes a means for recognizing a request from the mobile subscriber to change a selected one of the service features included in the feature profile, a means for validating the subscriber request, a means to determine whether the subscriber is currently using a mobile phone to which the profile is assigned, and a means to prevent changes to the profile (with the exception of the selected service feature requested), if the subscriber is not currently using the mobile phone to which the profile is assigned. Typically, the means for recognizing the request, validating the request, determining which telephone the subscriber uses, and the means to prevent changes to the profile are realized using one or more program modules 63 located in the node 65. The program modules 63 may reside in either the MSC1 50, the VLR 70, or the combination node 65.

If the subscriber is roaming outside of the HLR 80 area, or desires to change the feature profile through a PSTN, a pilot node 100 can be defined to receive access calls placed to a pilot telephone directory number. The subscriber MSDN, in combination with a PIN, can be used to access the profile in the memory 85 of the HLR 80. In this case, instead of the node 65 comprising a MSC1 50 or a MSC1 50 and VLR 70 combination, the node is simply the pilot node 100, including the various means for recognizing a request, validating the request, determining whether the subscriber is currently using a mobile phone to which the profile is assigned, and a means to prevent changes to the profile, with the exception of the selected service feature to be changed. As described previously, these various means are typically realized by way of one or more program modules 63 residing in the node 100.

Several possibilities exist for the implementation of the inventive embodiment wherein a pilot node 100 is incorporated. For example, during the process of changing the feature profile in the memory 85, the pilot node 100 may send a request, for example, a QUALREQ (including a feature change flag, e.g., a proprietary ORIGINATION FLAG), to the HLR 80 associated with the MSDN of the subscriber requesting the change. If the HLR 80 is successful in recognizing the identity of the subscriber, the HLR 80 will send a return result, including the subscriber feature profile information contained in the memory 85, along with the stored, or second, PIN of the subscriber. This is compared to the first PIN entered by the subscriber to validate the request. If the first, entered, PIN is valid, the subscriber may be queried as to the desired changes from the pilot node 100 using an audio announcement format.

Various features, in the form of a menu, can be announced to the subscriber for change. The HLR 80 may make use of Remote User Interaction Directive (RUIDIR) messages to direct the pilot node 100 to announce options to the subscriber, such as "You currently have call waiting active, enter #1 to deactivate it." or "Voice mail is now deactivated, enter #1 to activate it." That is, the pilot node 100 may be directed by the HLR 80 to respond in an intelligent fashion to requests for changes from the subscriber. The subscriber is not prompted with a simple request which takes no notice of the current status of activation, such as "Enter #1 to activate 900 call blocking, and enter #0 to deactivate 900 call blocking," as occurs in the prior art.

Another embodiment of the apparatus for changing a mobile subscriber's feature profile in a telecommunications network involves downloading the user feature profile information to a database 110 in electronic communication with the pilot node 100 to allow the node 100 to formulate queries directly. While it may initially be more cost-effective to make use of standard RUIDIR messages, since the mechanism for passing them is currently in place, downloading profile information would relieve network traffic congestion somewhat by allowing the intelligence for driving the query process to be moved from the HLR 80 to the pilot node 100. In any event, the modified profile is still sent to the HLR 80 after completion of the request process, and implementation of the change.

The menu query process used by the nodes 65, 75 or the node 100, is meant to include the step of checking the profile for those features which are able to be implemented according to the profile definition, and those features which are prohibited, based on the fees paid by the subscriber, or other limits imposed by the telecommunications network 10, or service provider. If the requested change is not implemented before an unexpected link failure or time-out from the telecommunications network 10 supervisory elements, then the profile in the memory 85 of the HLR 80 will remain unchanged. However, once the appropriate FEATREQ message has been sent to the HLR 80, the profile may be updated, even after an unexpected link failure or time-out.

Figure 2:
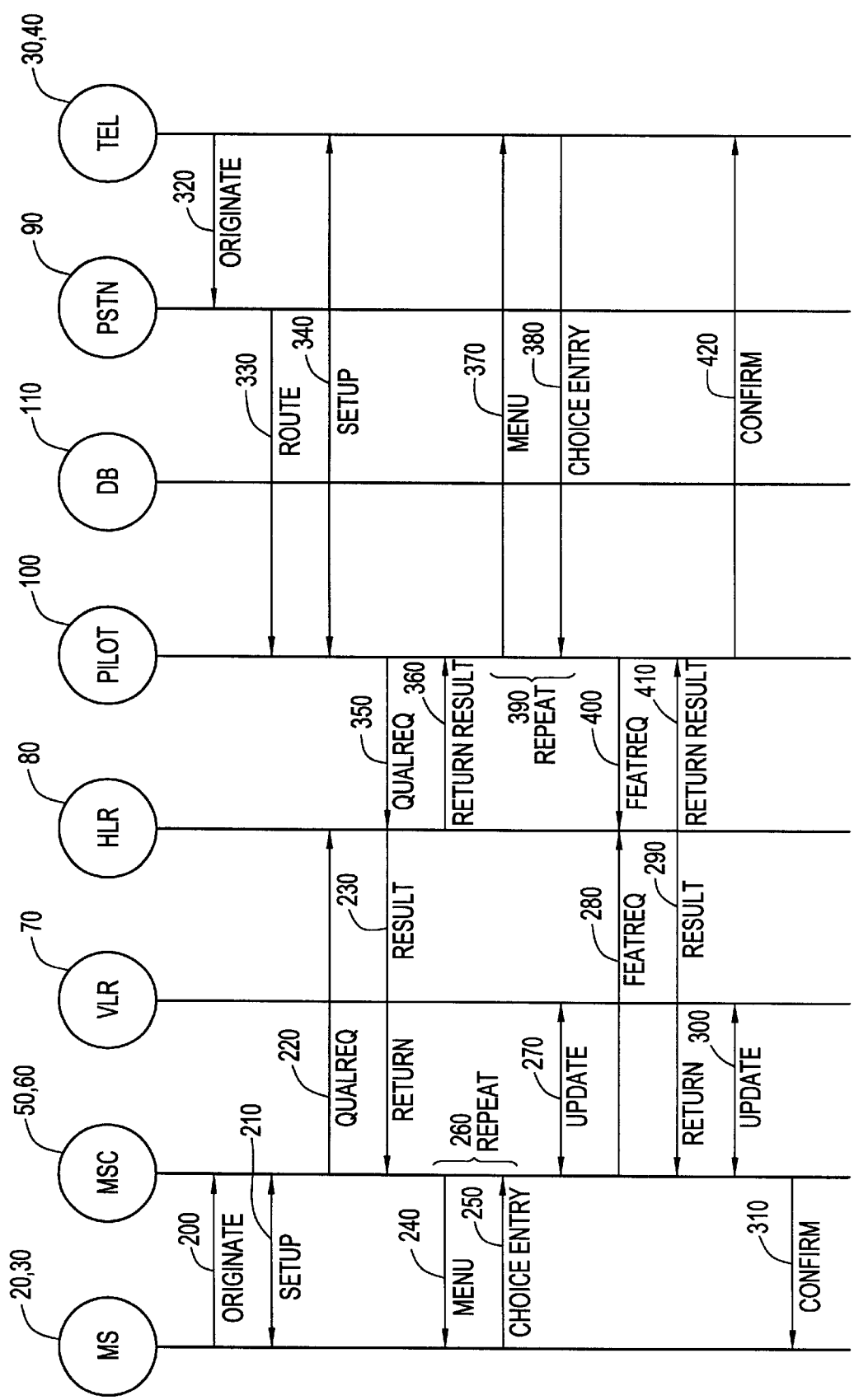
FIG. 2 is a flow chart diagram illustrating the method of the present invention.

Turning now to FIG. 2, a flow diagram of the method for changing a mobile subscriber's feature profile in a telecommunications network can be seen. The individual elements, such as MS 20, 30; MSC 50, 60, VLR 70, HLR 80, PSTN 90, pilot node 100, database 110, and telephones 30, 40 represent the components of the apparatus of the present invention. The numbered arrows, such as step 200 and 210, etc., represent various steps in the method which are accomplished in order to change the feature profile.

Assuming that the method for changing a mobile subscriber's feature profile is implemented using a mobile station, either an AMS 20, or a NMS 30, the process begins with call origination at step 200. For example, using the NMS 30, the origination may begin with dialing a feature doce appropriate to a non-assigned telephone, e.g. "*33," plus a separator, e.g. "#" and a PIN, e.g. "1234." Thus, the originating call may comprise the digits "*33#1234. If the proper code and digits are dialed, the call is then set up at step 210. Thus, a mobile subscriber has sent a request to the MSC1/VLR node 65, or the MSC2/VLR node 75 to change a selected one or more of the service features contained in the feature profile. For the AMS 20, the Feature Code may be that which is appropriate to an assigned telephone, e.g., "*44", and the call originated with "*44#1234."

To validate the request wherein "*33" was entered, a Qualification Request (QUALREQ) message is sent to the HLR 80 in step 220. A flag (e.g., a proprietary ORIGINATION FLAG) within the QUALREQ message 220 is set to inform the HLR 80 that no changes will be made to the subscriber's feature profile, except that requested by the subscriber. This prevents the automatic invocation of changes to the profile, such as to the location of the mobile phone to which the profile is assigned, or changes to the activity indicator corresponding to the mobile phone to which the profile is assigned. While such changes will be allowed in the case of an AMS 20 used during the step of requesting a change to a selected service feature (i.e., wherein "*44" is entered, for example), such changes are particularly undesirable when an NMS 30, or landline phone 40, are used to request such changes.

Once the QUALREQ request 220 has been made, with or without the QUALREQ flag being set to prevent undesired changes in the feature profile, a return result message is sent from the HLR 80 to the node 65, or 75, as appropriate, along with the feature profile for the subscriber. The subscriber PIN contained in the memory 85 is also sent to the appropriate node 65, 75.

If the PIN entered by the subscriber matches that sent by the HLR 80 (i.e., is valid), along with the other entered information, the request is validated and the subscriber is queried, usually with an audible menu in step 240 to determine what service feature is to be activated or de-activated within the feature profile. The announced menu items are only those which are available to the particular subscriber requesting the change. Unauthorized or prohibited service features will not be offered for change.

At this point, the subscriber may enter, using the keypad of the AMS 20 or NMS 30 for example, the desired service features and their activation status at step 250. The process of menu queries or prompting in step 240, and choice entry in step 250, may be repeated for several times in step 260 to support the user interaction necessary to obtain the required information by the apparatus. Typically, multiple profile feature change selections will require multiple menu prompts 240 and choice entries 250.

After the selection process is complete, the data within the appropriate MSC/VLR node 65, 75 is updated in step 270 and a Feature Request (FEATREQ) message 280 is sent from the appropriate node 65, 75 (i.e., whichever was accessed by the subscriber) to the HLR 80. In the FEATREQ message 280, the FEATREQ data flag (e.g. a proprietary ORIGINATION FLAG) is set to indicate that a feature profile update is requested. Further, the flag is set in the FEATREQ message 280 to indicate that no other changes to the feature profile should be made, with the exception of the selected one of the service features, if the subscriber is not currently using the mobile phone to which the profile is assigned (i.e., using NMS 30 and not AMS 20). The feature profile in the HLR 80 is updated by using a program module 64 to change the selected one or more of the service features, and a Return Result message 290 is sent back to the appropriate node 65, 75 to indicate that the update is complete. The profile data in the VLR 80 is also updated in step 300, and a confirmation message 310 is returned to the subscriber at the AMS 20 or NMS 30, as appropriate.

The method for changing a mobile subscriber's feature profile in a telecommunications network 10 may also comprise steps which involve using a landline phone 40 in electronic communication with a PSTN 90. Alternatively, a roaming AMS 20 or NMS 30 can be used to access a pilot node 100, in lieu of the PSTN 90. In either case, the pilot node 100 is the focal point of change requests by the subscriber, rather than an MSC 50, 60 within a more conventional structure. As mentioned previously, the pilot node 100 may be attached to a database 110, wherein the pilot node 100 may possess intelligence and information about the user profile so as to drive the entire exchange between the subscriber requesting changes to the feature profile. Alternatively, the pilot node 100 may be directed entirely by the HLR 80, using conventional RUIDIR messages.

The method for requesting a change to a selected one of several service features included in the subscriber feature profile begins with using the NMS 30 or a landline phone 40 in step 320 to effect call origination. In this implementation of the invention, the subscriber dials a pilot number to access the pilot node 100, the MSDN for the subscriber phone, and the PIN associated with the subscriber phone. By comparing the MSDN with either of an Electronic Serial Number (ESN) or a landline calling phone number associated with the request, the pilot node 100 will be able to determine whether the mobile phone to which the profile is assigned is being used to effect the change request. Once the call is originated in step 320, it will be routed in step 330 to the pilot node 100, and the subscriber's HLR 80 using the pilot node number entered by the subscriber in step 320. If the origination information in step 320 is accepted by the pilot node 100, the call will be set up in step 340 so that the change request may be implemented.

A QUALREQ message, including the appropriate feature change flag, is sent from the pilot node 100 to the HLR 80, requesting a return of the subscriber's feature profile in step 350. A Return Result message will be sent from the HLR 80 to the pilot node 100 in step 360.

Some implementations of the invention might merely require dialing the pilot number plus the MSDN of the subscriber in the origination step 320 for access to feature profile changes. In this case, the menu prompt or announcement step 370 and choice entry step 380 will also include the task or step of requesting the PIN associated with the AMS 20.

In any case, once the PIN is entered by the subscriber, and validated by the pilot node 100, a dialogue occurs between the pilot node 100 and the subscriber at the NMS 30 or landline phone 40 by way of steps 370 and 380 (i.e., menu query and choice entry, respectively), to determine the selection of service profile features to be changed. Step 390 indicates the repetition of steps 370 and 380 as required to support the subscriber interaction needed to obtain all of the information to be changed.

Once the selection process is complete, a FEATREQ message 400 is sent from the pilot node 100 to the HLR 80. The appropriate change data FEATREQ flag is set within the FEATREQ message to allow updating the service feature(s) requested, while preventing other changes to the profile that would normally occur if the flag was not set, such as location update, fraudulent activity detection, and/or authentication. Of course, if an AMS 20 (i.e., the telephone assigned to the profile) is used through the PSTN or pilot node 100 to request changes to the feature profile, all of the regular profiles features which are automatically updated generally by the network 9, or as a result of check and inquiries conducted by the HLR 80 (e.g., phone location, phone activity indicator, fraud detection, authentication, etc.), will be updated also, as is the case with the method illustrated in steps 200–310.

The HLR 80 feature profile is then updated so as to change the selected service features and a Return Result message 410 is sent from the HLR 80 to the pilot node 100. This prompts sending a confirmation message from the pilot node 100 to the subscriber stationed at the NMS 30 or landline phone 40 in step 420 to complete the method.

The method for changing a mobile subscriber's feature profile in a telecommunications network, wherein the profile including one or more service features, may also be characterized as comprising the steps of: requesting a change to (at least one) selected service feature; validating the change requested; preventing the start of other network 9 activities unrelated to changing the selected service feature(s), if the request is not made using the mobile phone (i.e., the AMS 20) to which the profile is assigned; and changing the selected service feature(s). The method may include the step of determining whether the mobile phone to which the profile is assigned (i.e., the AMS 20) was used during the requesting step, or the step of preventing a change to the current location of the mobile phone to which the profile is assigned, if the AMS 20 is not used during the requesting step.

The step of requesting a service feature change may include the step of entering a feature code by the mobile subscriber, as described above (e.g., "*33" for the NMS 30, or "*44" for the AMS 20). The step of requesting a service feature change may include the step of sending a Qualification Request message.

The step of preventing the start of other network activities unrelated to changing the selected service feature(s) may include preventing at least one of the activities related to subscriber location update, fraudulent activity detection, and/or authentication; or include the step of sending a Feature Request message, which message may in turn include a proprietary ORIGINATION flag.

While the QUALREQ message and FEATREQ message, along with proprietary ORIGINATION FLAGS, have been used in a exemplary fashion to illustrate the operation of the apparatus and method of the present invention, it should be readily apparent to those skilled in the art that other messages or message forms can also be used to transport the required change request information between a node and the appropriate HLR. These include messages which are created specifically for the transport of such information between the node and the HLR 80.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. An apparatus for changing a profile of a mobile subscriber in a telecommunications network, the profile including one or more service features, said apparatus comprising:
   a Home Location Register (HLR) having means to change the profile and a memory for storing the profile, and
   a node in electronic communication with the HLR, the node including:
   means for recognizing a request from the mobile subscriber to change a selected one of the service features,
   means for validating the request from the mobile subscriber,
   means for determining whether the mobile subscriber is currently using a mobile phone to which the profile is assigned, and
   means for preventing changes to the profile, with the exception of a change to the selected one of the service features, if the mobile subscriber is determined not to be currently using the mobile phone to which the profile is assigned when making the recognized request.

2. The apparatus of claim 1, wherein the profile includes a current location of the mobile phone to which the profile is assigned, said current location is not changed if the mobile subscriber uses a phone other than the mobile phone to which the profile is assigned to make the request.

3. The apparatus of claim 1, wherein the profile includes an activity indicator for the mobile phone to which the profile is assigned, said activity indicator is not changed if the mobile subscriber uses a phone other than the mobile phone to which the profile is assigned to make the request.

4. The apparatus of claim 1, wherein the means for recognizing the request from the mobile subscriber makes use of a feature code entered by the mobile subscriber.

5. The apparatus of claim 1, wherein the means for validating the mobile subscriber request makes use of a Personal Identification Number (PIN) entered by the mobile subscriber.

6. The apparatus of claim 1, wherein the means for determining whether the mobile subscriber is currently using the mobile phone to which the profile is assigned makes use of a Mobile Subscriber Directory Number (MSDN) and either of a selected one of an Electronic Serial Number (ESN) or a landline calling phone number.

7. The apparatus of claim 1, wherein the means for preventing changes to the profile makes use of a program module located in the node.

8. A method for changing a profile of a mobile subscriber in a telecommunications network, the profile including one or more service features, the method comprising the steps of:
   receiving a request from a mobile subscriber by a node to change a selected one of the service features within the profile;
   validating the request;
   determining whether the mobile subscriber is currently using a mobile phone to which the profile is assigned;
   preventing changes to the profile, with the exception of a change to the selected one of the service features, if the mobile subscriber is determined not to be currently using the mobile phone to which the profile is assigned when making the request; and
   changing the selected one of the service features.

9. The method of claim 8, wherein the profile includes a current location of the mobile phone to which the profile set is assigned, said current location is not changed if the mobile subscriber uses a phone other than the mobile phone to which the profile is assigned to make the request.

10. The method of claim 8, wherein the profile includes an activity indicator corresponding to the mobile phone to which the profile is assigned, said activity indicator is not changed if the mobile subscriber uses a phone other than the mobile phone to which the profile is assigned to make the request.

11. The method of claim 8, wherein the node includes a memory and the step of validating the request includes the step of comparing a first Personal Identification Number (PIN) entered by the mobile subscriber to a second PIN contained in the memory.

12. The method of claim 8, wherein the step of determining whether the mobile subscriber is currently using the mobile phone to which the profile in assigned includes the step of comparing a Mobile Subscriber Directory Number (MSDN) and either of a selected one of an Electronic Serial Number (ESN) or a landline calling phone number associated with the request.

13. The method of claim 8, wherein the step of sending a request to the nodes includes dialing the Directory Number of a Pilot Node in electronic communication with a Public Switched Telephone Network (PSTN).

14. The method of claim 8, wherein the node includes a Mobile Switching Center.

15. The method of claim 14, wherein the node includes a Visitor Location Register.

16. The method of claim 8, wherein the node is a Pilot Node in electronic communication with a Public Switched Telephone Network (PSTN).

17. A method for changing a mobile subscriber's feature profile in a telecommunications network, the profile including one or more service features, comprising the steps of:

receiving a request to change a selected one of the service features;

validating the request;

preventing changes to the profile, with the exception of a change to the selected one of the service features, if the request is not made using the mobile phone to which the profile is assigned; and changing the selected one of the service features.

18. The method of claim 17, including the step of determining whether the mobile phone to which the profile is assigned was used during the receiving step.

19. The method of claim 18, wherein the step of determining whether the mobile phone to which the profile is assigned is being used during the receiving step includes the step of comparing a Mobile Subscriber Directory Number (MSDN) and either of a selected one of an Electronic Serial Number (ESN) or a landline calling phone number associated with the request.

20. The method of claim 17, including the step of preventing a change to a current location of the mobile phone if said mobile subscriber uses a phone other than the mobile phone to which the profile is assigned to make the request.

21. The method of claim 17, wherein the step of receiving a request to change a selected one of the service features includes the step of receiving a Qualification Request message.

22. The method of claim 21, wherein the Qualification Request message includes a proprietary ORIGINATION flag.

23. The method of claim 17, wherein the step of preventing changes to the profile includes the step of sending a Feature Request message.

24. The method of claim 23, wherein the Feature Request message includes a proprietary ORIGINATION flag.

25. A method for changing a feature profile of a mobile subscriber in a telecommunications network, the profile including one or more service features, said method comprising the steps of:

receiving a request to change a selected one of the service features;

validating the request;

determining whether a mobile phone to which the profile is assigned was used to request the change;

preventing the start of other network activities unrelated to the activity of changing the selected one of the service features, if the request is not made using the mobile phone to which the profile is assigned; and changing the selected one of the service features.

26. The method of claim 25, wherein the step or receiving a request to change the selected one of the service features includes the step of entering a feature code by the mobile subscriber.

27. The method of claim 25, including the step of preventing a change to a current location of the mobile phone to which the profile is assigned if said mobile phone is not used to request the change.

28. The method of claim 25, wherein the step of receiving a request to change the selected one of the service features includes the step of receiving Qualification Request message.

29. The method of claim 25, wherein the step of preventing the start of other network activities unrelated to the activity of changing the selected one of the service features includes preventing at least one of the activities related to subscriber location update, fraudulent activity detection, or authentication.

30. The method of claim 25, wherein the step of preventing the start of other network activities unrelated to the activity of changing the selected one of the service features includes the step of receiving a Feature Request message.

31. The method of claim 30, wherein the Feature Request message includes a proprietary ORIGINATION flag.

32. A system comprising:

a communications node issuing a request for a download of a mobile subscriber's feature profile, the request including a first indicator if a mobile subscriber input precipitating the request is received from any source other than a mobile station for that mobile subscriber, the request specifying that changes to the mobile subscriber's feature profile are not to be made in response to processing of the request for download; and a home location register storing the mobile subscriber's feature profile and operable to make certain changes to the mobile subscriber's feature profile, the home location register is operable, responsive to receipt of the request and the first indicator from the communications node, to retrieve and download the mobile subscriber's feature profile and further to inhibit any action on the part of the home location register to make a change in that stored and downloaded mobile subscriber's feature profile.

33. The system of claim 32 wherein the request comprises a QUALREQ message and the first indicator comprises a flag within the QUALREQ message.

34. The system of claim 32 wherein the change that is inhibited from being made by the home location register in the stored subscriber's feature profile comprises a change in home location register stored information that would identify a current location of a mobile station for the mobile subscriber.

35. The system of claim 32 wherein the change that is inhibited from being made by the home location register in the stored subscriber's feature profile comprises a change in home location register stored information that would identify an activity indicator of a mobile station for the mobile subscriber.

36. The system of claim 32 wherein the communications node is a mobile switching center (MSC)/visitor location register (VLR).

37. The system of claim 32 wherein:

the communications node, responsive to mobile subscriber input, makes changes to the downloaded mobile subscriber's feature profile, and then issues a request for mobile subscriber's feature profile update to the home location register, the request including a second indicator specifying that changes to the feature profile are not to be made in response to processing of the request for update; and the home location register is operable, responsive to receipt of the request and the second indicator, to inhibit any action on the part of the home location register to make a change in the stored mobile subscriber's feature profile except for those specific changes identified in the received request.

38. The system of claim 37 wherein the communications node includes the second indicator in the request for update if the mobile subscriber input is received from any source other than a mobile station for that mobile subscriber.

39. The system of claim 37 wherein the request comprises a FEATREQ message and the first indicator comprises a flag within the FEATREQ message.

40. The system of claim 37 wherein the change that is inhibited from being made by the home location register in the stored subscriber's feature profile comprises a change in home location register stored information that would identify a current location of a mobile station for the mobile subscriber.

41. The system of claim 37 wherein the change that is inhibited from being made by the home location register in the stored mobile subscriber's feature profile comprises a change in home location register stored information that would identify an activity indicator of a mobile station for the mobile subscriber.

42. The system of claim 37 wherein the change that is inhibited from being made by the home location register in the stored mobile subscriber's feature profile comprises a change in home location register stored information that would result from fraud detection with respect to a mobile station for the mobile subscriber.

43. The system of claim 37 wherein the change that is inhibited from being made by the home location register in the stored mobile subscriber's feature profile comprises a change in home location register stored information that would result from authentication of a mobile station for the mobile subscriber.

44. A method, comprising the steps of:

storing a mobile subscriber's feature profile in a home location register;

issuing a request from a communications node to the home location register for a download of the mobile subscriber's feature profile, wherein the request includes a first indicator if a mobile subscriber input precipitating the request is received from any source other than a mobile station for that mobile subscriber, the request specifying that changes to the mobile subscriber's feature profile are not to be made in response to processing of the request for download;

operating the home location register to make certain changes to the mobile subscriber's feature profile in response to the request; and operating the home location register, responsive to receipt of the request and the first indicator, to retrieve and download the mobile subscriber's feature profile and inhibit any action on the part of the home location register to make a change in the stored and downloaded mobile subscriber's feature profile.

45. The method of claim 44 wherein the request comprises a QUALREQ message and the first indicator comprises a flag within the QUALREQ message.

46. The method of claim 44 wherein the change that is inhibited from being made by the home location register in the stored mobile subscriber's feature profile comprises a change in home location register stored information that would identify a current location of a mobile station for the mobile subscriber.

47. The method of claim 44 wherein the change that is inhibited from being made by the home location register in the stored mobile subscriber's feature profile comprises a change in home location register stored information that would identify an activity indicator of a mobile station for the mobile subscriber.

48. The method of claim 44 wherein the communications node is a mobile switching center (MSC)/visitor location register (VLR).

49. The method of claim 44 further including the steps of:

changing by the communications node in response to mobile subscriber input of the downloaded mobile subscriber's feature profile;

issuing by the communication node a request for mobile subscriber's feature profile update to the home location register, the request including a second indicator specifying that changes to the feature profile are not to be made in response to processing of the request for update; and operating the home location register, responsive to receipt of the request and the second indicator, to inhibit any action on the part of the home location register to make a change in the stored mobile subscriber's feature profile except for those specific changes identified in the received request.

50. The method of claim 49 further including the step of including the second indicator in the request for update if the mobile subscriber input is received from any source other than a mobile station for that mobile subscriber.

51. The method of claim 49 wherein the request comprises a FEATREQ message and the first indicator comprises a flag within the FEATREQ message.

52. The method of claim 49 wherein the change that is inhibited from being made by the home location register in the stored mobile subscriber's feature profile comprises a change in home location register stored information that would identify a current location of a mobile station for the mobile subscriber.

53. The method of claim 49 wherein the change that is inhibited from being made by the home location register in the stored mobile subscriber's feature profile comprises a change in home location register stored information that would identify an activity indicator of a mobile station for the mobile subscriber.

54. The method of claim 49 wherein the change that is inhibited from being made by the home location register in the stored mobile subscriber's feature profile comprises a change in home location register stored information that would result from fraud detection with respect to a mobile station for the mobile subscriber.

55. The method of claim 49 wherein the change that is inhibited from being made by the home location register in the stored mobile subscriber's feature profile comprises a change in home location register stored information that would result from authentication of a mobile station for the mobile subscriber.

* * * * *

UNITED STATES PATENT AND TRADEMARK OFFICE
CERTIFICATE OF CORRECTION

PATENT NO.     : 6,449,479 B1                                          Page 1 of 1
DATED          : September 10, 2002
INVENTOR(S)    : Eduardo Sanchez It is certified that error appears in the above-identified patent and that said Letters Patent is hereby corrected as shown below:

Column 1,
Line 44, replace "usually be entry" with -- usually by entry --

Column 2,
Line 22, replace "mean" with -- means --

Column 5,
Line 2, replace "hlr" with -- HLR --

Column 6,
Line 40, replace "doce" with -- code --
Line 42, replace "digits "*33#1234" with -- digits "*33#1234." --

Column 10,
Line 53, replace "profile in" with -- profile is --
Line 59, replace "the nodes" with -- the node --

Column 11,
Line 53, replace "step or" with -- step of --
Line 63, replace "receiving Qualification" with -- receiving a Qualification --

Column 14,
Line 14, replace "communication" with -- communications --

Signed and Sealed this

Twenty-seventh Day of May, 2003

JAMES E. ROGAN
*Director of the United States Patent and Trademark Office*